United States Patent [19]
Carreras

[11] Patent Number: 4,689,758
[45] Date of Patent: Aug. 25, 1987

[54] MICROCOMPUTER CONTROLLED IMAGE PROCESSOR

[75] Inventor: Richard A. Carreras, Albuquerque, N. Mex.

[73] Assignee: The United States of America as represented by the Secretary of the Air Force, Washington, D.C.

[21] Appl. No.: 689,700

[22] Filed: Jan. 8, 1985

[51] Int. Cl.[4] .......................... G01B 9/02; G06F 15/31
[52] U.S. Cl. ..................................... 364/561; 356/356; 356/358; 250/201
[58] Field of Search ................................. 356/354–355, 356/363; 358/107, 222; 250/550, 201, 203 R; 364/561

[56] References Cited

U.S. PATENT DOCUMENTS

| | | | |
|---|---|---|---|
| 3,727,219 | 4/1973 | Graham | 343/5 CM |
| 3,836,256 | 9/1974 | Peters | 356/109 |
| 3,923,400 | 12/1975 | Hardy | 356/107 |
| 3,950,103 | 4/1976 | Schmidt-Weinmar | 356/106 R |
| 4,136,954 | 1/1979 | Jamieson | 356/349 |
| 4,188,122 | 2/1980 | Massie et al. | 356/360 |
| 4,295,741 | 10/1981 | Palma et al. | 356/349 |
| 4,362,932 | 12/1982 | Lewis | 250/203 |
| 4,371,946 | 2/1983 | Constantinides et al. | 364/822 |

Primary Examiner—Felix D. Gruber
Assistant Examiner—Brian M. Mattson
Attorney, Agent, or Firm—William G. Auton; Donald J. Singer

[57] ABSTRACT

The microcomputer controlled image processor receives an interference pattern of samples of pairs of transmitted laser beams from a charge couple device (CCD) camera. The present invention then calculates an optical path difference between each pair of beams using: an analog amplifier, an analog-to-digital (A/D) converter, a multiple accumulator controller, a programmable read-only-memory (PROM), a microcomputer, and a random access memory (RAM). The analog amplifier and A/D converter amplify and convert to digital the interference pattern received from the CCD camera. The multiple accumulator controller (MAC) receives the digital camera signal from the A/D converter, and adds correction factors for the non-linearities in the CCD camera. The PROM stores these correction factors, and supplies them to the multiple accumulator controller when needed. The random access memory receives and stores the corrected data from the multiple accumulator controller, and supplies the data to the microcomputer. The microcomputer receives the corrected digital interference pattern from the random access memory, and applies two algorithms to the data to yield estimates of the optical path difference between the two sampled laser beams. The optical path difference (OPD) is a measure of adjustment in the optical path lengths of the two sampled laser beams. When this OPD value is supplied to the laser transmitter, a correcting means can adjust the length of the optical paths of one or both of the sampled laser beams to bring them in phase with each other.

5 Claims, 12 Drawing Figures

EXPERIMENTAL CONFIGURATION

MICROCOMPUTER CONTROLLED IMAGE PROCESSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to a microcomputer controlled image processor which enables a laser transmitter to transmit optically phased laser beams from an array of multiple optical laser telescopes by calculating an optical path difference between pairs of laser beams which allows the laser transmitter to phase match transmitted laser beams.

Recent demands in telescope design for large primary telescopes have brought new emphasis to synthetic aperture applications. The idea of a synthetic aperture or phased array is not new and has been successfully applied in radar systems and astronomical telescopes. The new emphasis, though, is attempting to phase telescopes at visible wavelengths.

The successful application of phasing an array of multiple telescopes into a synthetic aperture extends the numerous benefits of using arrays, as experienced by radar systems, to optical laser telescopes. Phased arrays are modular. They can be built in stages and to some extent be operational as soon as the first telescope is operational. An array of independent telescopes has functional flexibility. Several simultaneous operations can be carried out by individual telescopes within a synthetic aperture. For example, images can be directed to different cameras or spectrographic devices for simultaneous observations in separate imaging modes. When operated as a transmitter, a synthetic aperture has the option of sending beams in different directions.

Phased array apertures have virtually no size limitations. By modularly combining telescopes in a phased configuration, laser transmitters of previously unimaginable sizes can be constructed. Large optics fabrication has historically posed an impermeable barrier to building large aperture telescope systems. By phasing a number of reasonably-sized telescopes, extremely large transmitting apertures can be achieved with present fabrication technology.

The present application hereby incorporates by reference the patent filed by Janet S. Fender et al, entitled "Optically Phased Laser Transmitter", in Air Force Invention No. 16,653, and U.S. Pat. No. 4,639,586.

The apparatus of the Fender patent is a laser transmitter which optically phases the output of an array of multiple optical laser telescopes to achieve the performance of a single laser transmitter of equivalent size.

The Fender apparatus performs matching between pairs of laser beams using an array containing at least two optical telescopes which become useable as a laser transmitter when combined with an optical phase matching system consisting of: a collecting telescope, a detector array, two fold mirrors, analog-to-digital converter, microprocessor, and two sets of correcting mirrors.

The two optical telescopes are adjacent to each other, and transmit two separate outgoing laser beams which require phase matching. The original source of the two outgoing beams may be either: a single laser beam, which has been divided (monochromatic); or two separately transmitted polychromatic laser beams.

The collecting telescope sits in front of the two optic telescopes and bridges the gap between them. In this way, the collecting telescope is able to intercept samples of outgoing laser beams from the edges of both telescopes and focus them, through the two fold mirrors to the detector array.

The detector array may be either a line scan or an area charge coupled device (CDD), which reads out the fringe pattern by generating an interference pattern.

The microcomputer controlled image processor of the present invention performs the functions attributed to the analog-to digital converter and the microprocessor in the Fender patent. The present invention receives the interference pattern between samples of pairs of transmitted laser beams from a CCD camera, then performs a calculation of the difference in optical path lengths between the two beams which allows the laser transmitter to match the phase of the outgoing beams by adjusting the optical path lengths.

The image processor of the present invention returns the optical path differences to the laser transmitter, where it is used to adjust the phase by the correcting mirrors which adjust the optical path lengths of the two outgoing beams. Monochromatic light requires phasing only within a range of one wavelength. Polychromatic sources cannot tolerate $2\pi$ ambiguities and therefore require both coarse and fine phase adjustments for multi-wavelength interference. Both the coarse and fine tuning refer to the phase estimating algorithms which provide adjustments to the optical path lengths of the two beams, and form a part of the present invention.

In view of the foregoing discussion, it is apparent that there currently exists the need for an image processor which is capable of estimating the difference in optical path lengths needed to match the phase of two beams of either monochromatic or polychromatic light from the interference pattern of those two beam. The present invention is directed towards satisfying that need.

SUMMARY OF THE INVENTION

The present invention provides a means of enabling a laser transmitter to transmit optically phased laser beams from an array of multiple optical telescopes.

The microcomputer controlled image processor receives an interference pattern of samples of pairs of transmitted laser beams from a charge couple device (CDD) camera. The present invention then calculates an optical path difference between each pair of beams using: an analog amplifier, an analog-to-digital (A/D) converter, a multiple accumulator controller, a programmable read-only-memory (PROM), a microcomputer, and a random access memory (RAM).

The analog amplifier and A/D converter amplify and convert to digital the interference pattern received from the CCD camera.

The multiple accumulator controller (MAC) receives the digital camera signal from the A/D converter, and adds correction factors for the non-linearities in the CCD camera.

The PROM stores these correction factors, and supplies them to the multiple accumulator controller when needed.

The random access memory receives and stores the corrected data from the multiple accumulator controller, and supplies the data to the microcomputer.

The microcomputer receives the corrected digital interference pattern from the random access memory, and applies two algorithms to the data to yield estimates of the optical path difference between the two sampled laser beams. The optical path difference (OPD) is a measure of adjustment in the optical path lengths of the two sampled laser beams. When this OPD value is supplied to the laser transmitter, a correcting means can adjust the length of the optical paths of one or both of the samples laser beams to bring them in phase with each other.

Monochromatic light requires phasing only within a range of one wavelength. Polychromatic sources cannot tolerate $2\pi$ ambiguities and therefore require both coarse and fine phase adjustments for multi-wavelength interference. Both this coarse and fine tuning refer to the OPD estimating algorithms which provide adjustments to the optical path lengths of the two beams.

The "coarse tuning" is supplied by the "linear algorithm" of the present invention which finds the OPD from the interference pattern to within one half the wavelength of the sampled laser beams. The linear algorithm is:

$$OPD = \frac{f_R - f_L}{f_R + f_L} \quad (1)$$

Where R and L are the subsidiary peaks to the left and right of the main peak in the interference pattern supplied by the CCD camera.

The "fine tuning" is supplied by the "global algorithm" which is capable of estimating the OPD to within $\lambda/100$ (where $\lambda$ equals the power weighted average of the wavelengths of the samples laser beams.

The global algorithm is:

$$V = \frac{I \max - I \min}{I \max + I \min} \quad (2)$$

where I max and I min are single values of maximum and minimum intensities of the focused fringe pattern supplied by the CCD camera, and V is the visibility of the two beams. The theory behind the global algorithm is that phase matching between the two sampled beams occurs where visibility is maximized.

The microcomputer outputs the OPD calculated from the interference pattern of the two sampled beams to the laser transmitter which adjusts the optical path length of the transmitted beams to bring then in phase. This enables the optically phased laser transmitter to phase match an array of multiple laser telescopes, as decribed in the Fender patent, for use as a single laser transmitter.

It is an object of the present invention to estimate the difference in phase between sampled laser beams, and to provide this estimate in terms of the difference in optical path length between the sampled beams.

It is another object of the present invention to perform this estimate using the measure of the interference pattern of the two sampled beams.

It is another object of the present invention to supply an accurate estimate of the optical path difference to a laser transmitter which uses the information to adjust the optical path lengths of the two sampled beams to bring them in phase of each other.

These together with other objects, features, and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a microcomputer controlled image processor which enables a laser transmitter to transmit optically phased laser beams from an array of multiple optical laser telescopes by calculating an optical path difference between pairs of laser beams from the interference pattern between the two beams.

Figure 1:
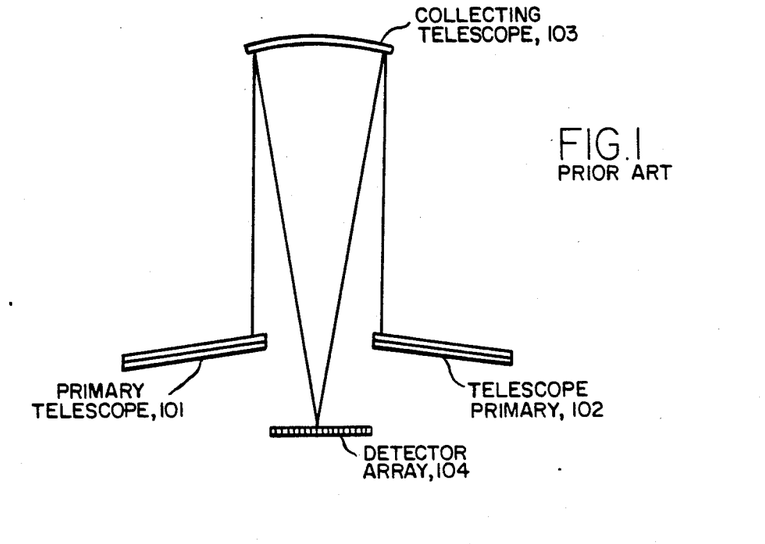
FIGS. 1 and 2 are examples of laser transmitters which use the present invention.
Figure 2:
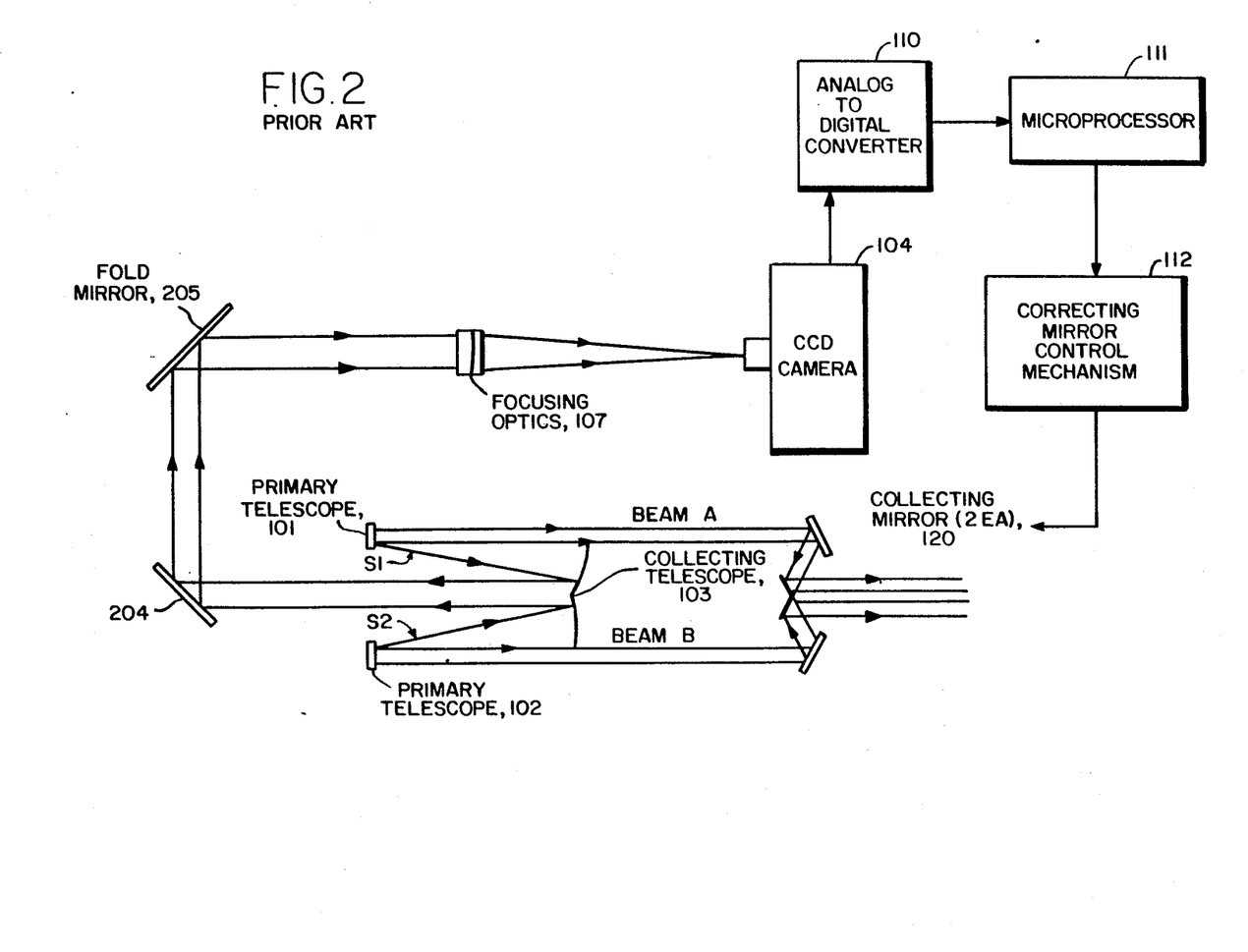
Figure 3:
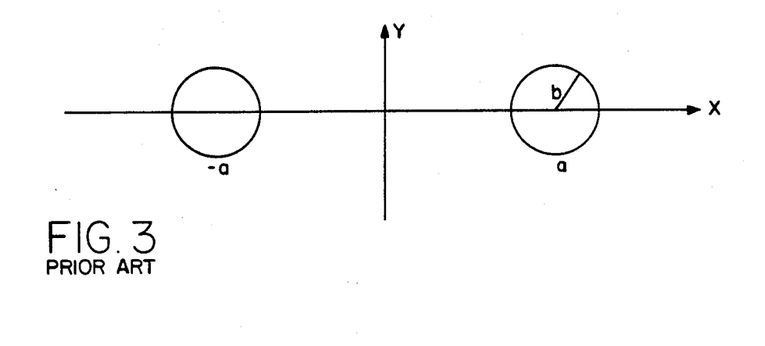
FIG. 3 is a sketch of the beam geometry of sampled laser beams.

FIGS. 1, 2, and 3 provide examples of a laser transmitter which uses the present invention. FIGS. 1, 2, and 3 are from a patent filed by Janet S. Fender et al, entitled "Optically Phased Laser Transmitter", in Air Force Invention No. 16,653, and U.S. Pat. No. 4,639,586, the disclosure of which is hereby incorporated by reference.

The Fender apparatus performs phase matching between pairs of laser beams. The technique of the Fender invention, as it applied to an array consisting of only two primary telescopes, is illustrated in FIG. 1. The two primary telescopes 101 and 102 are transmitting telescopes, which are positioned very close to each other. The collecting telescope 103 (not drawn to scale) sits in front of the two transmitting telescopes 101 and 102 and bridges the gap between them. In this way, the collecting telescope 103 is able to intercept samples of outgoing laser beams from the edges of both primary telescopes and focus them on the detector array 104 where an interference pattern is created. The measurement of the interference pattern will be converted to digital and used to determine the phase difference between the two beams from the primary telescopes.

FIG. 2 is a functional block diagram of an optically phased laser transmitter which uses two primary telescopes in an array. As shown in FIG. 1, the primary telescopes 101 and 102 emit two independent laser beams A and B, which may be either monochromatic or polychromatic beams.

The collecting telescope 103 collects samples of the outgoing laser beams from the edges of both telescopes 101 and 102, the collected samples are then conducted by fold mirrors 204 and 205 to the focusing optics 107, which serves to focus the samples to a common point on the array of detectors 1-4 where an interference pattern is created. In the embodiment of the invention of FIG. 2, the detector array is a CCD camera, which generates the interference pattern by sending out the fringe pattern. However, a line scan or other elements known in the art are also suitable as a means of detecting the intereference pattern.

From the CCD camera 104, the measurement of the interference pattern is used by a signal processing means to determine the relative phase difference between the two beams. The signal processing means used by the Fender laser transmitter is actually the present invention, which was simplified in FIG. 2 to consist of the analog-to-digital converter 110 which digitizes the output of the CCD camera 104, and a microprocessor 111 which uses the unique phase generating algorithms, described below, on the interference pattern between the two samples beams, to estimate the difference in phase between the two beams. Once the phase difference is known, the optical path length of the two beams A and B from the primary telescopes 101 and 102 can be adjusted by the set of correcting mirrors 120, as controlled by the control mechanism 112.

FIG. 3 is an illustration of the beam geometry of the two samples of laser beams, which are brought to a common focus on the detector array 104 of FIG. 2. The two samples are separated by a distance of 2a at their centers, and each circular sample has radius b. If the laser beams exiting the telescopes are pointed in the same direction and focused to the same range, then the beam samples will focus to the same point creating an interference pattern which will be measured by the detector array. If the laser radiation consists of N different wavelengths $\lambda_n$; (n=1, 2 ... N), then the measured irradiance pattern will be the sum of the irradiances of the individual frequencies.

Let $I_n$ (r) denote the irradiance in the focal plane at the position r=(x,y) and at the wavelength $\lambda_n$. Then:

$$I_n(r) = (2A_n b/r)^2 J_1^2 (k_n rb/F) \cdot [1+\cos(k_n(d+2ax/F))] \quad (1)$$

here $A_n$ is the amplitude at wavelength $\lambda_n$ of the beam samples; $k_n = 2\lambda/\lambda_n$; F is the focal length of the collecting optics; and d is the difference in the optical path lengths of the two transmitted beams.

Figure 4:
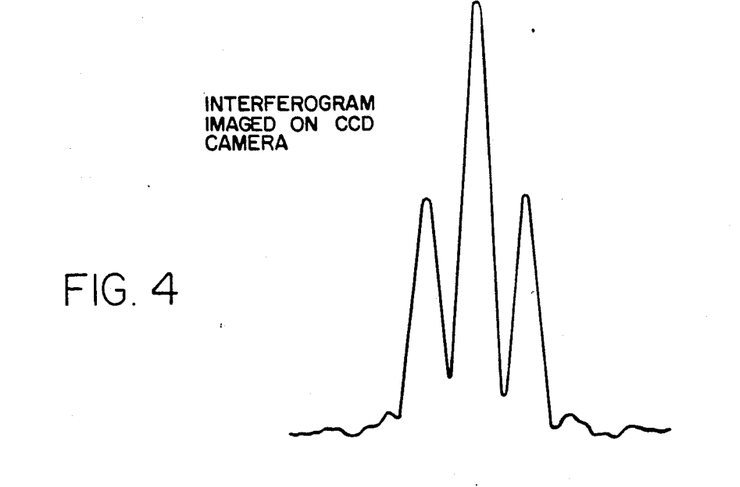
FIG. 4 is a sketch of an interferogram output of the CCD camera of FIG. 2.

FIG. 4 is a sketch of an interferogram output of the CCD camera 104 of FIG. 2. This interferogram has a main peak and subsidiary peaks to the right and left of the main peak and represents the analog signal that is input into the present invention.

Figure 5:
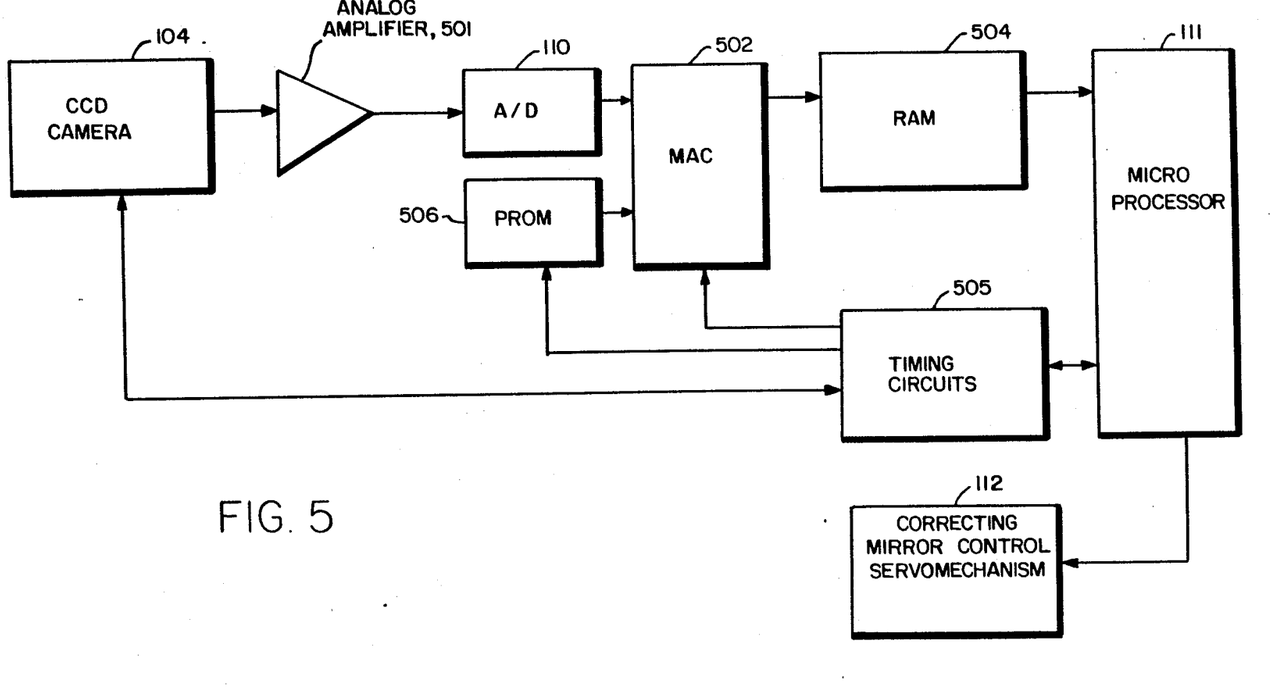
FIG. 5 is a block diagram of an embodiment of the present invention.

FIG. 5 is a functional block diagram of the present invention as it is used with the phased array laser transmitter of FIG. 2. In other words, the CCD camera 104 of the present invention receives samples of outgoing beams from two adjacent telescopes in the manner described above in the discussion of FIGS. 1 and 2. The system of the present invention is provided with at least one pair of sampled laser beams by a collecting telescope and focusing optics. Referring back to FIG. 2, the collecting telescope 103 sits in front of two transmitting telescopes 101 and 102 and bridges the gap between them. This enables the collecting telescope to intercept samples of outgoing laser beams from both telescopes. The samples are conducted by the fold mirrors 204 and 205 to the focusing optics 107, which will focus them on the CCD camera 104. The readers attention is now directed back to FIG. 5 for a discussion of the operation of the present invention. The CCD camera 104 generates an analog signal depicting the interference pattern between at least one pair of sampled laser beams. The analog amplifier 501 and analog-to-digital (A/D) converter 110 amplifies and converts the interference pattern into a digital signal. In the embodiment of the invention of FIG. 5, the A/D converter is a 9-bit converter which digitizes the analog signal from CCD camera at 5 MHz and is running at a 1 kHz frame rate. A digital data bus interconnects and conducts signals between: the A/D converter 110, the multiple accumulator controller 502, the RAM 504, the microprocessor 111, the timing circuits 505, and the PROM 506.

The digital interference signal is input into a multiple accumulator controller (MAC) 502 where the camera data is multiplied and added to correction factors to compensate for any known non-linearities of the CCD camera 104. The programmmable read-only-memory (PROM) 506 stores and repeatedly supplied these correction factors to the MAC 502.

The corrected interference pattern is sent from the MAC 502 to a random acess memory (RAM) 504 which stores and supplies the interference pattern to the microprocessor 111. The size of the random access memory is dependent upon the number of telescopes in the array of the laser transmitter. The example of an array of just two telescopes is presented only to demonstrate the technique of aligning the phase of one telescope with another. However, by using the beam of any one telescope as a reference, an array of virtually an unlimited number of telescopes, all of which could be phased matched with the reference beam.

The timing circuits 505 are nothing more that a conventional oscillator which operates as a system clock. As with all system clocks, these timing circuits generate a clock pulse to synchronize the activities of: the CCD camera 104, the PROM 506, the MAC 505, and the microprocessor 111.

The timing circuits selected for use will vary with the selection of the other equipment, particularly the microprocessor 111. In the system of FIG. 5, the microprocessor 111 comprises a Motorola MC68000. For this particular microprocessor, a 10 MHz clocking signal is needed. Therefore the timing circuits 505 include an oscillator which outputs a 10 MHz square wave clocking pulse.

The microprocessor 111 shown in FIG. 5 is a 16/32 bit Motorola M68000. As mentioned above in the discussion of the RAM 504, the selection of the microprocessor is dependent upon the size of the array. The microprocessor 111 is capable of applying two algorithms (which are part of the present invention) to the interference pattern data to yield estimates of the optical path difference (OPD) between the two sampled laser beams.

When the optical path difference is supplied to the correcting mirror control servomechanism 112 of the laser transmitter, the length of the optical path of one or both of the sampled beams can be adjusted to bring the beams in phase with each other.

Monochromatic light requires phasing only within a range of one wavelength. Polychromatic sources cannot tolerate $2\pi$ ambiguities and therefore require both coarse and fine phase adjustments for multi-wavelength interference. Both the coarse and fine tuning refer to the OPD estimating algorithms which provide adjustments to the optical path lengths of the two beams.

The "coarse tuning" is supplied by the "linear algorithm" which finds the OPD from the interference pattern to within one half the wavelength of the sampled laser beams.

The linear algorithm is:

$$OPD = \frac{\int R - \int L}{\int R + \int L} \quad (1)$$

where R and L are the subsidiary peaks to the left and right of the main peak in the interference pattern supplied by the CCD camera 104.

FIG. 4 depicts an interferogram signal as the sampled beams are imaged on the CCD camera 104. The interferogram signal is characterized by a main peak with subsidiary peaks to the left and right of the main peak. Referring back to equation 1, $\int R$ and $\int L$ respectively refer to: the integral of the subsidiary peaks to the right of the main peak; and the integral of the subsidiary peaks to the left of the main peak. More specifically, each integral yields the area under the respective curves of the right and left subsidiary peaks. In other words, $\int R$ and $\int L$ yield an integrated intensity of the adjacent sidelobes which are respectively to the right side, and left side of the central peak in the interference pattern. The ratio of equation 1 yields a number. This is the amount, in terms of $\lambda$, of the optical path length adjustment needed to bring the signals in phase with each other. For example, if the ratio of Equation 1 is 0.5, then the amount of adjustment needed is one-half $\lambda$.

The formula compares the integrated intensity of the two adjacent side lobes and normalized this quantity by their sum. The algorithm is periodic every mean wavelength of OPD. The OPD is presented as an amount in terms of $\lambda$, where $\lambda$ is the power weighted average of the two sampled laser beams.

Figure 6:
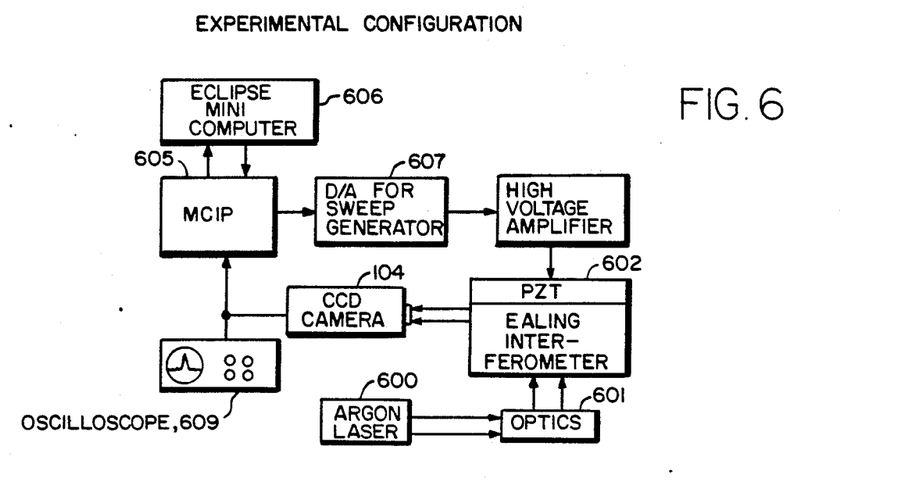
FIG. 6 is a block diagram of the equipment configuration used to test the present invention.

FIG. 6 shows a block diagram of an experimental configuration used to test the present invention. The laser source for the test is an argon laser 600 which transmitted six of the eight possible lines of the argon spectrum during the experiment. The lines and relative power levels were 5145/0.45, 5017/0.06, 4965/0.12, 4880/0.23, 4765/0.10, 4579/0.04. The laser beam was expanded to approximately 1.5 inches in diameter and masked with a two-hole pattern as shown in FIG. 3. This two-hole pattern simulated the two samples of the outgoing wave from two adjacent subapertures. The interferometer is used to adjust the OPD between these two simulated samples. Since the two-hole pattern is amplitude split, one hole of the split pattern is clocked at each mirror. The two samples exit the interferometer 602, and are focused and imaged onto a Charge Coupled Device (CCD) camera. The CCD camera 104 is a Fairchild line scan camera with 1 by 256 photo-detector pixels.

The microcomputer controlled image processor (MCIP) 605 of the present invention receives the interference pattern from the CCP camera 104 and calculates the OPD. The OPD is output to a minicomputer 606 for analysis as well as though a digital-to-analog (D/A) converted 607 and high voltage amplifier 608 to the interferometer 602 which adjusts the optical path lengths of the two beams.

Figure 7:
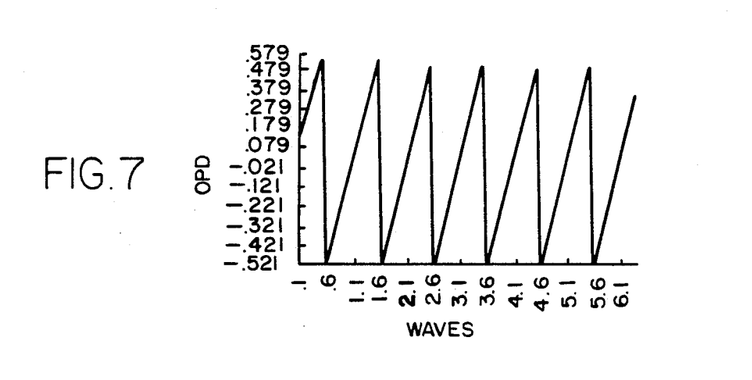
FIG. 7 is a computer generated chart of the results of the linear algorithm.

FIG. 7 is a chart of the simulated results of the linear algorithm of equation 1. The OPD shown in the vertical axis is presented in terms of $\lambda$ where $\lambda$ is the power weighted average of two sampled laser beams.

Figure 8:
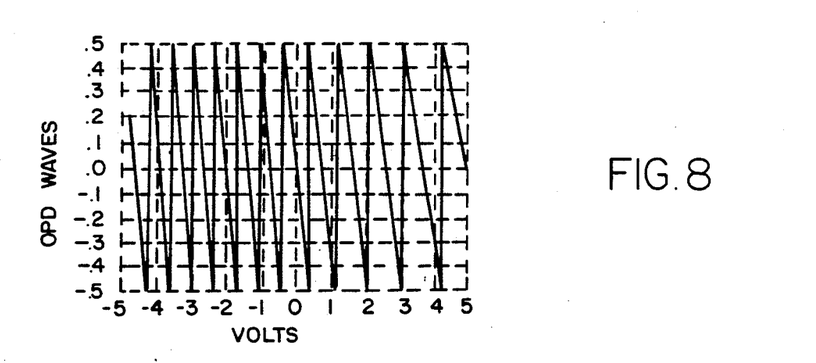
FIG. 8 is a chart of the experimental measurements of the test configuration of FIG. 6.

For the test, the tilt adjustment of the mirrors of the interferometer 602 were moved a given step size while the MCIP took data from the CCD camera 104, and calculated the OPD values. FIG. 8 was generated in this fashion and shows the experimental results of the use of the linear algorithm of the present invention.

The plot of FIG. 8 presents, in its vertical axis the OPD in terms of $\lambda$. From this slot it is clear that the computer analysis of FIG. 7 was quite accurate, and that due to the $2\pi$ ambiguity it is impossible, with the linear algorithm, to know when the optical path lengths of the two sampled beams are exactly equal. Finally, looking at FIG. 8, there is some widening of the plot towards the right side. It is believed that this is caused by the nonlinearity of the high voltage amplifier 608, used in driving the interferometer 602.

Figure 9:
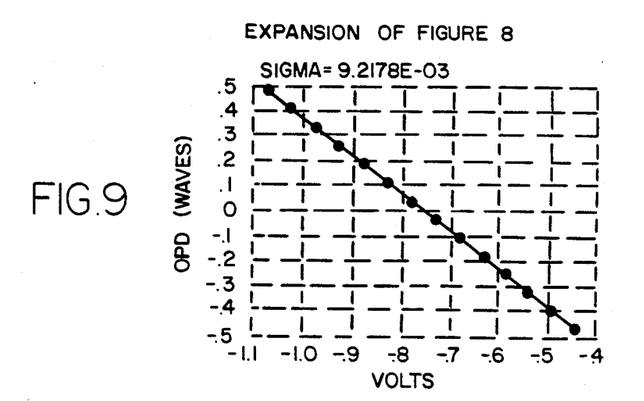
FIG. 9 is an expanded view of FIG. 8.

FIG. 9 is an expanded view of one of the sloped lines for the OPD calculation, shown in FIG. 8. A straight line curve fit was calculated for this data and the standard deviation (signal) was estimated as $\sigma = 0.0092178\lambda$, or equivalent to $\lambda/108$.

Figure 10:
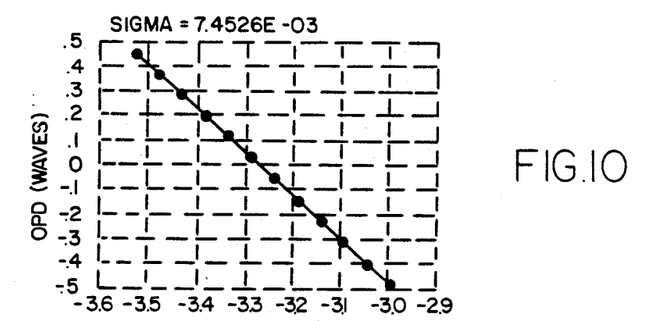
FIG. 10 is a chart of averaged optical path difference data.

To explore the nature of his noise and determine whether it was random or systematic, several frames of data for a single position were averaged. This data is shown in FIG. 10. This plot shows the line has indeed smoothed out and that the structure was to some degree random in nature. Using a straight line fit and calculating the standard deviation, was found to be $\sigma = 0.0074526\lambda$, or $\lambda/134$.

The "fine tuning" is supplied by the "global algorithm" which is capable of estimating the OPD to within $\lambda/100$ (where $\lambda$ equals the power weighted average of the wavelengths of the sampled laser beams).

The global algorithm is:

$$V = \frac{I\max - I\min}{I\max + I\min} \quad (2)$$

where I max and I min are single values of maximum and minimum intensities of the focused fringe pattern supplied by the CCD camera, and V is the visibility of the two beams. The intensity values for $I_{max}$ and $I_{min}$ are measureable directly from the CCD camera for the focused fringe pattern, and are given watts per steradian. The theory behind the global algorithm is that phase matching between the two signal beams occurs where visibility is maximized.

An example of the use of the global algorithm is presented below.

Figure 11:
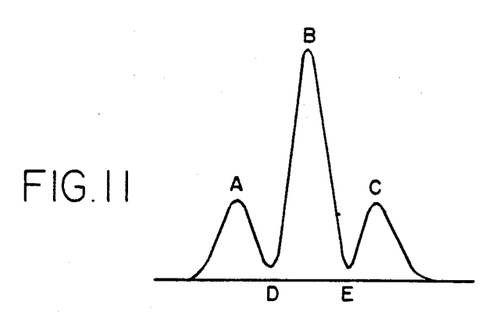
FIG. 11 is a focused fringe pattern, presented to demonstrate the use of the global algorithm.

FIG. 11 is a focused fringe pattern which is offered to illustrate the use of the global algorithm. In FIG. 11, points A through E are values of intensity measured by a single pixel. The formula is easily implemented, since A, D, E, and C are always referenced to B. That is, finding B, determines A, D, E, and C to the nearest pixel. Thus, there is no requirement to perform multiple peak and valley searches. A single search for the peak, B, suffices.

The global algorithm of Equation 2, when applied to the interference pattern of FIG. 11, gives the following result in time of visibility:

$$V = \frac{(A + D) + (B + D) + (B + E) + (C + E)}{(A + D) + (B + D) + (B + E) + (C + E)} \quad \text{and}$$

Figure 12:
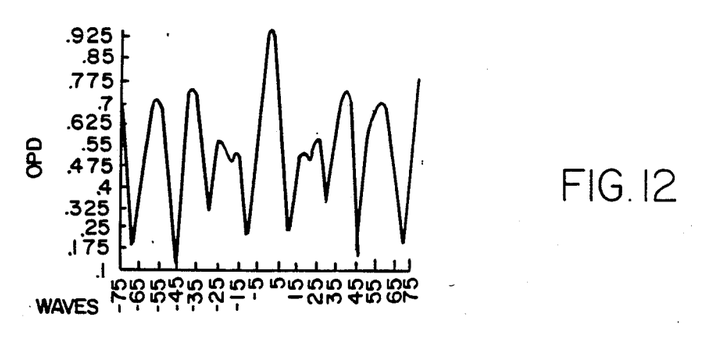
FIG. 12 is a chart of the computer generated visibility of the invention using the global algorithm.

-continued
$$V = \frac{A + C + 2B - 2D - 2E}{A + C + 2B - 2D - 2E}$$

where A through E are as defined pictorially in FIG. 11. This algorithm was simulated using six wavelengths of the argon spectrum. Each wavelength was assigned a relative power weighting, as presented previously. FIG. 12 shows the computer generated results. (Note, only 0 to 75 waves OPD was generated since the function is even. −75 to 0 was plotted as a mirror image of the generated results for a better comparison with the experimental results.) The curves does provide a global measure of the zero fringe as was desired. The combining of two lobes on either side of the central lobe and the small amount of structure on each lobe is attributed to the spatial quantization of the focused fringe pattern.

Difference of the integrated and side lobes of two sample beams, using the linear algorithm of equation 1, is an accurate linear measure of optical path difference. While experimental results have achieved calculated accuracies of better than $\lambda/100$, the linear algorithm is cyclical for every $\lambda$. The global algorithm of equation 2 is used to find the OPD within $\lambda/2$ using a variation of Michelson's visibility definition. FIG. 12 is a plot of the computer generated visibility results using the global algorithm.

Returning now to FIG. 2, the present invention allows a laser transmitter to use separately transmitted beams as a single transmitter by providing an accurate OPD to a correcting means. The OPD is used to adjust the path difference so that phase matching between the sampled beams is achieved.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a charged coupled device camera which receives samples of two signals and generates an interference pattern between the two signals, a microcomputer controlled image processor which receives said interference pattern from said charge coupled device camera and calculates therefrom an optical path difference between said two signals, said optical path difference being a measure of distance which would bring the two signals in phase to each other if applied to the length of their optical paths, said microcomputer controlled image processor comprising:

an analog amplifier producing an output signal by receiving and amplifying said interference pattern from said charge coupled device camera;

an analog-to-digital converter producing an output signal by receiving and converting into a digital signal said output signal of said analog amplifier;

a memory means receiving, storing and outputting data signals, including those received from said analog-to-digital converter;

a means for conducting signals from the analog-to-digital converter to the memory means;

a data processing means receiving said output signals from said memory means and calculating therefrom said optical path difference using a linear algorithm, said linear algorithm establishing a quantity created from a difference in measures of adjacent sidelobes on left and right sides of a central peak in said interference pattern, said quantity being normalized by dividing said difference by a sum of said measures, and wherein said data processing means comprises a computer which uses the following equation as said linear algorithm:

$$OPD = \frac{\int R - \int L}{\int R + \int L}$$

OPD is said optical path difference whose quantity is given in terms of $\lambda$, where $\lambda$ equals a power weighted average of said two signals:

$\int R$ is an integrated intensity of adjacent sidelobes to the right side of said central peak in said interference pattern; and $\int L$ is an integrated intensity of adjacent sidelobes to the left side of said central peak in said interference pattern.

2. A microcomputer controlled image processor as defined in claim 1 wherein said data processing means includes a computer capable of using a global algorithm to calculate visibility between the two signals from said interference pattern from said charge coupled device camera, said global algorithm being given by the following equation:

$$V = \frac{I\max - I\min}{I\max + I\min}$$

V is the visibility between said two signals;

I max and I min are measures of maximum and minimum intensities in all peaks and valleys of said central peak and said adjacent sidelobes of said interference pattern.

3. A microcomputer controlled image processor as defined in claim 2 including:

a programmable read-only-memory which contains and outputs known characteristics of non-linearities in said charge coupled device camera, and wherein said memory means comprises a random access memory and said conducting means comprises a multiple accumulator controller which receives and outputs from said programmable read-only-memory and said output signal from said analog-to-digital converter, said multiple accumulator controller providing said random access memory with a digital interference pattern signal which has been corrected for said characteristics of non-linearities in said charge coupled device camera by adjusting said output from said analog-to-digital converter.

4. A microcomputer controlled image processor as defined in claim 3 wherein said two signals provided by said charge coupled device camera comprise samples of monochromatic light from two separate optical laser telescopes, and said optical path difference calculated by said data processing means is cyclic with $2\pi\lambda$ where $\lambda$ is a measure of wavelength of said monochromatic light.

5. A microcomputer controlled image processor as defined in claim 3 wherein said two signals provided by said charge coupled device camera comprise samples of polychromatic light from two separate optical laser telescopes.

* * * * *